(No Model.) 6 Sheets—Sheet 1.
P. C. HEWITT.
GLUE MANIPULATING MACHINERY.

No. 548,056. Patented Oct. 15, 1895.

WITNESSES:
William Goebel.
G. M. Hopkins.

INVENTOR
P. C. Hewitt
BY
Munn & Co
ATTORNEYS.

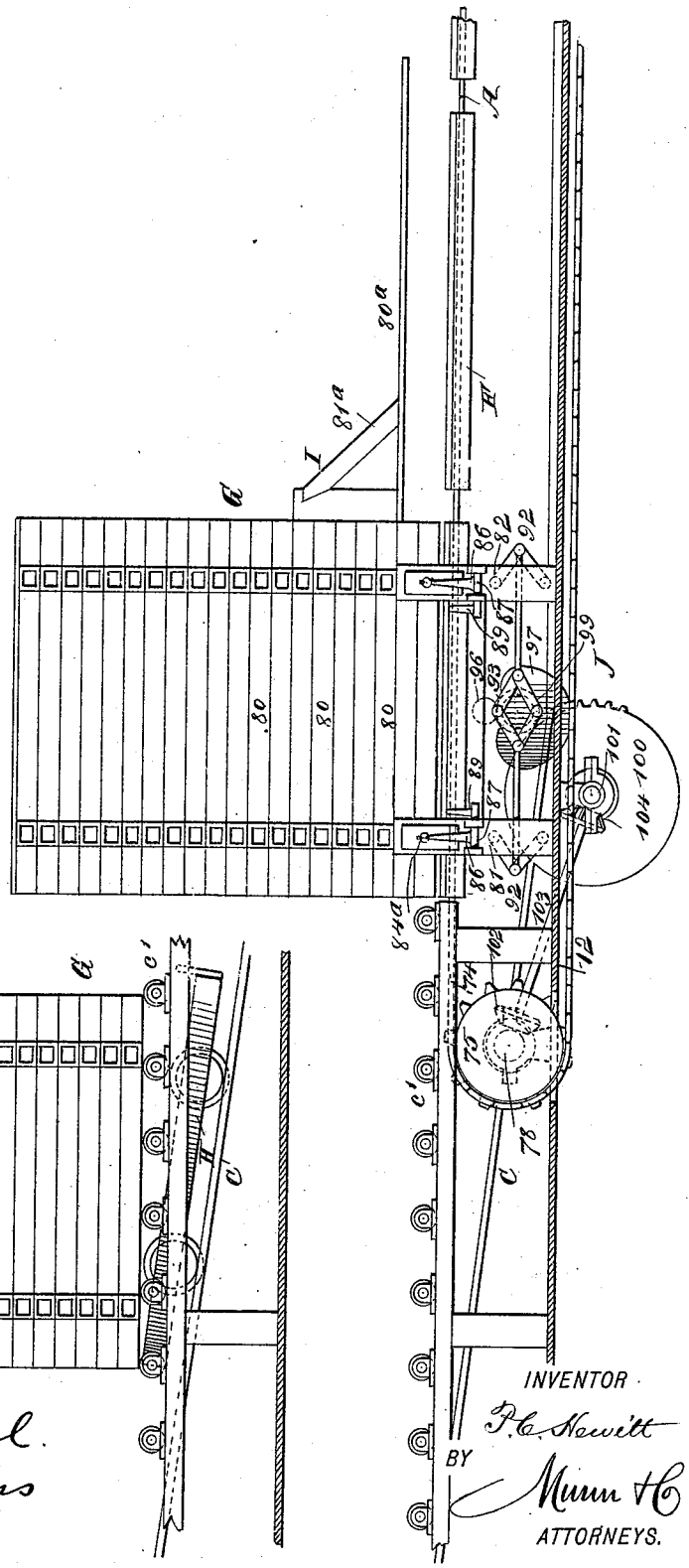

(No Model.)  P. C. HEWITT.  6 Sheets—Sheet 3.
GLUE MANIPULATING MACHINERY.
No. 548,056.  Patented Oct. 15, 1895.
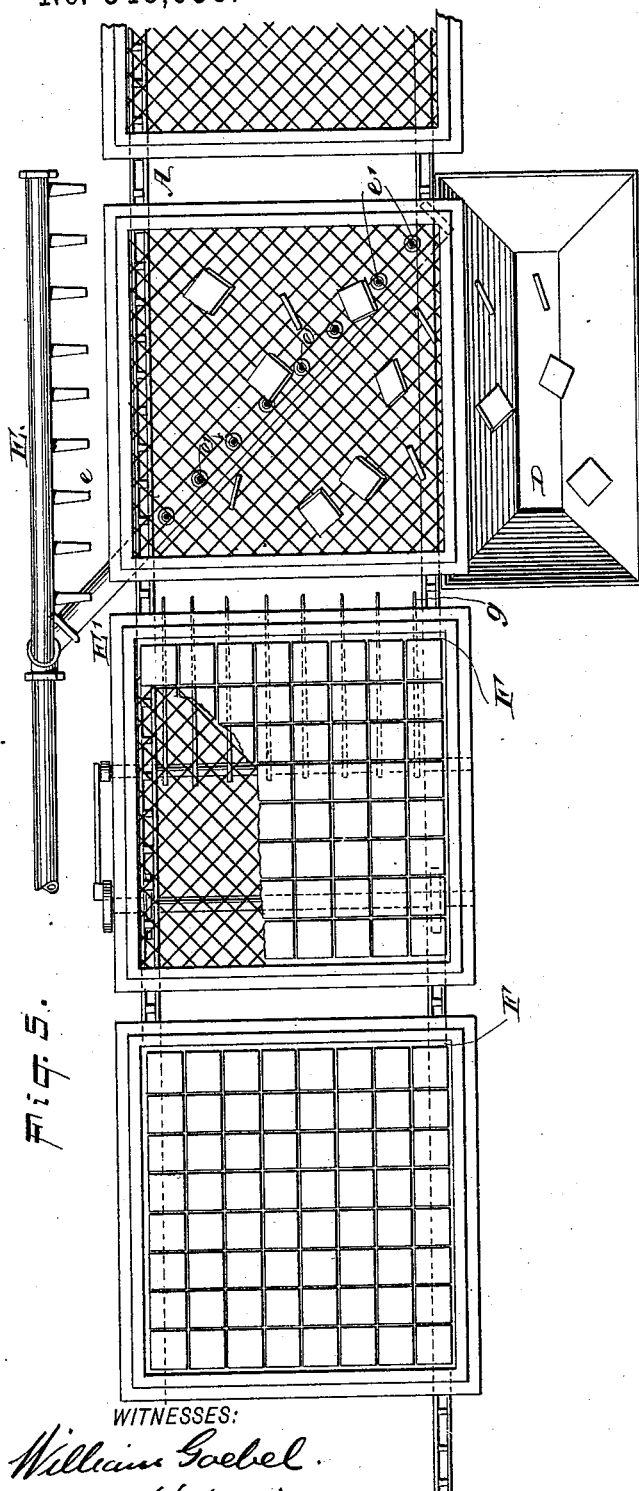
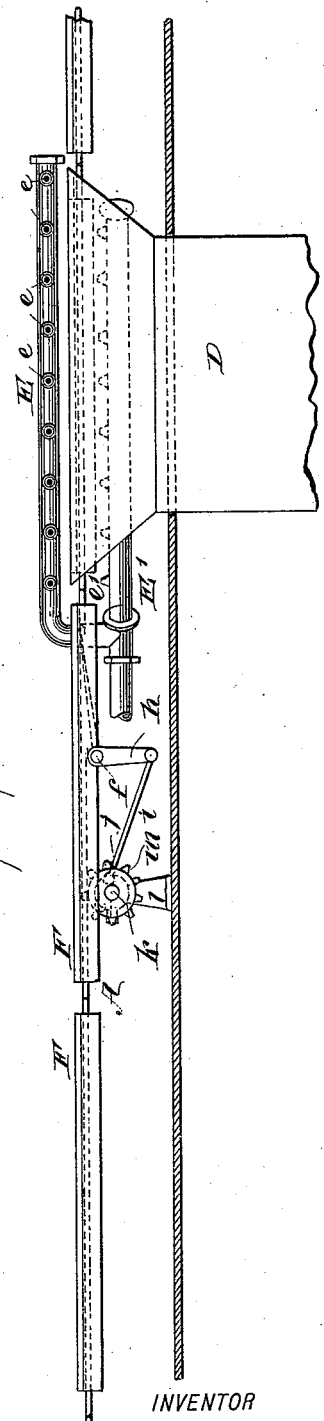

(No Model.) 6 Sheets—Sheet 4.
P. C. HEWITT.
GLUE MANIPULATING MACHINERY.
No. 548,056. Patented Oct. 15, 1895.
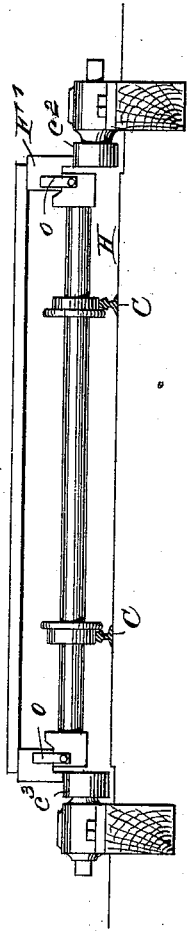
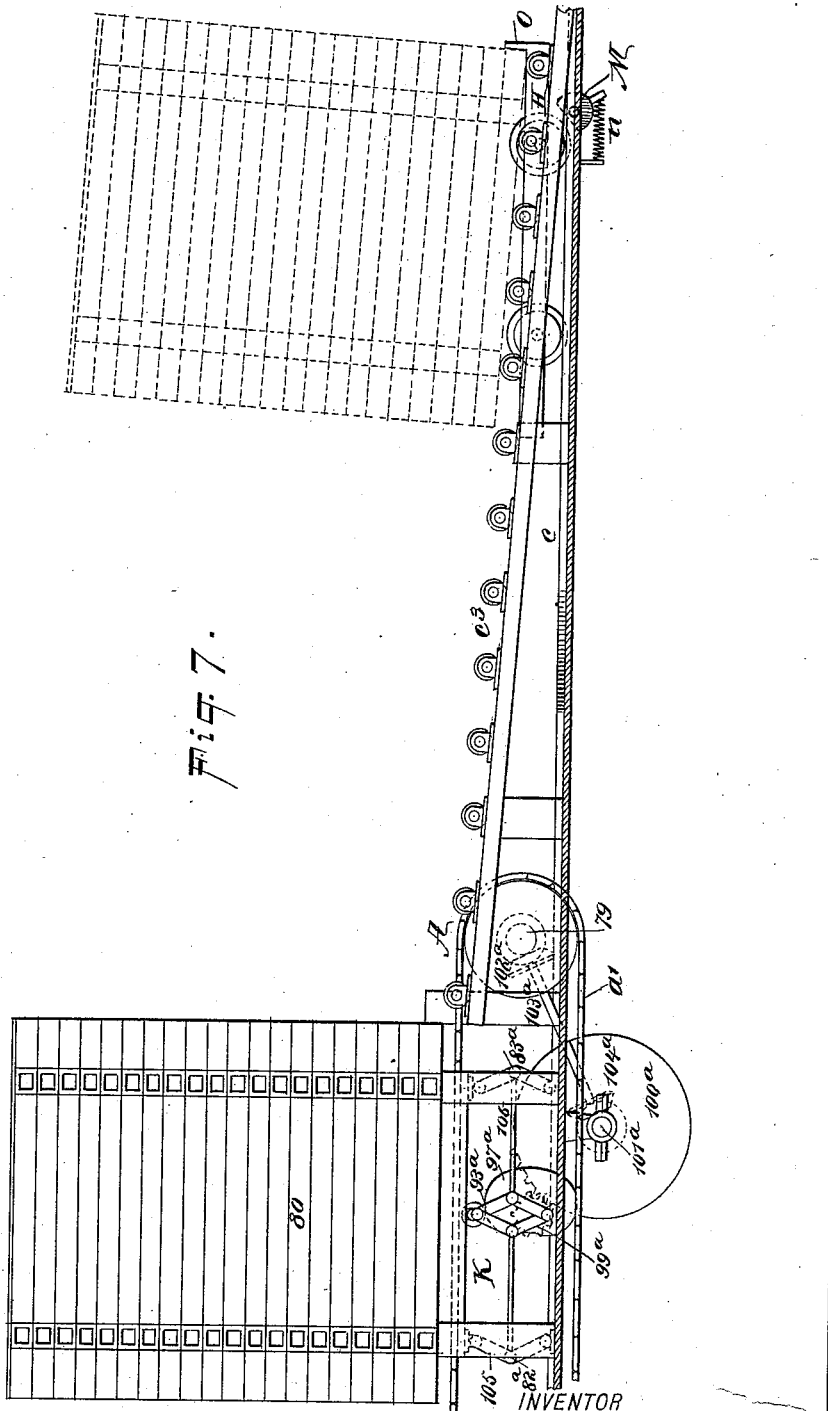
WITNESSES:
William Goebel
G. M. Hopkins
INVENTOR
P. C. Hewitt
BY
Munn & Co
ATTORNEYS.

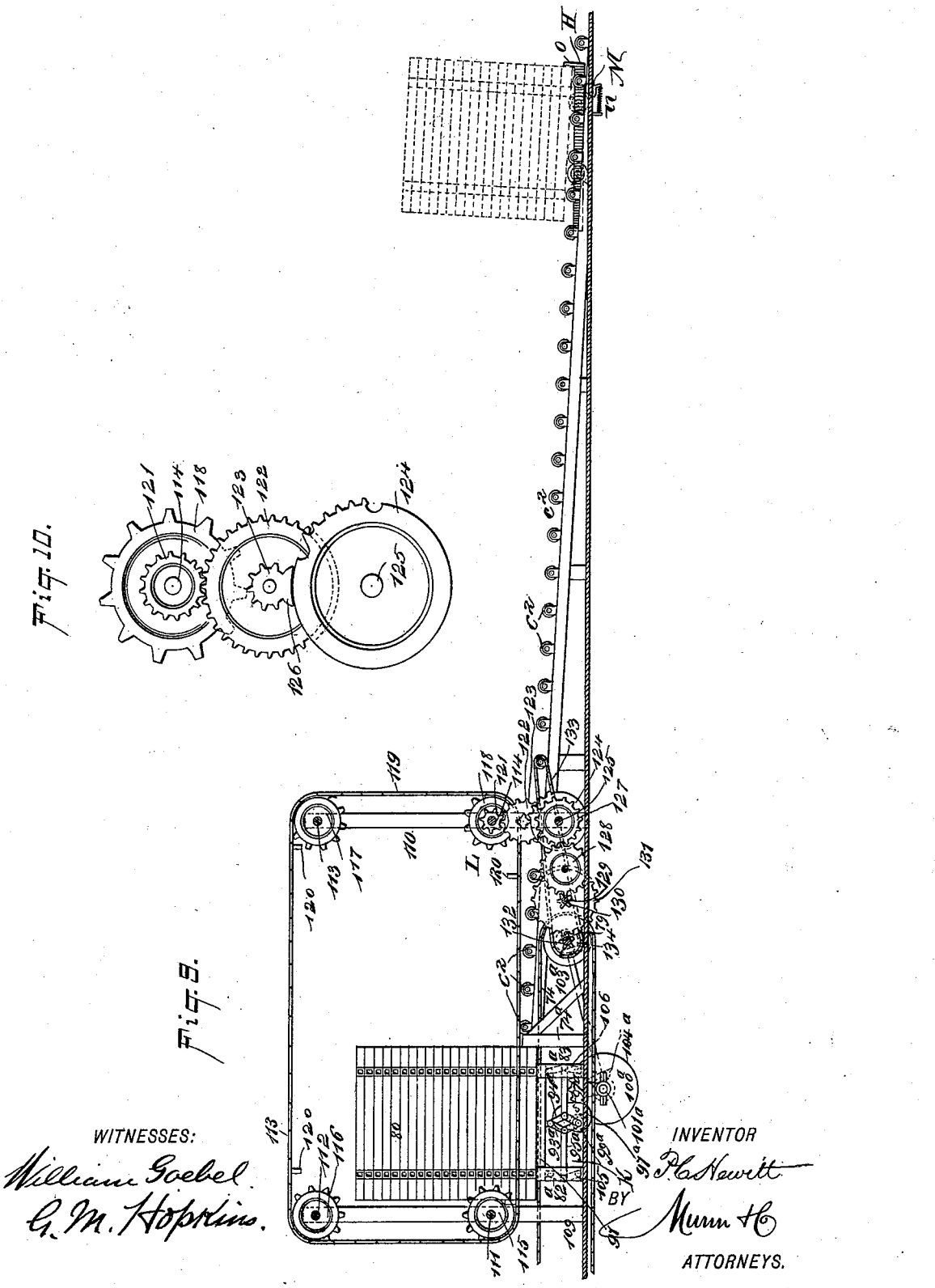

(No Model.) 6 Sheets—Sheet 6.
P. C. HEWITT.
GLUE MANIPULATING MACHINERY.
No. 548,056. Patented Oct. 15, 1895.
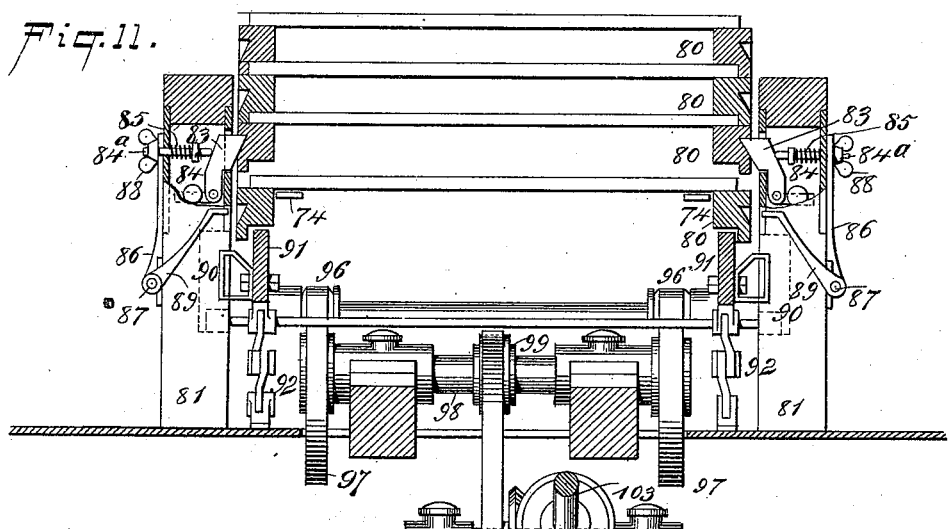
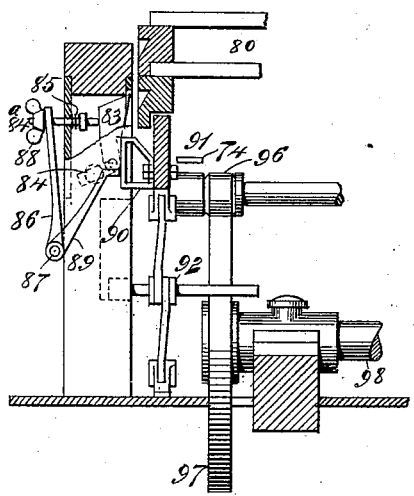
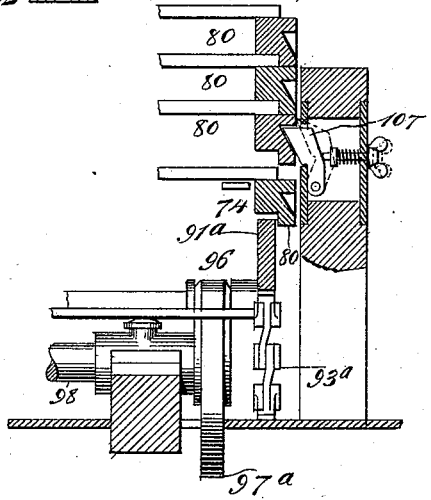
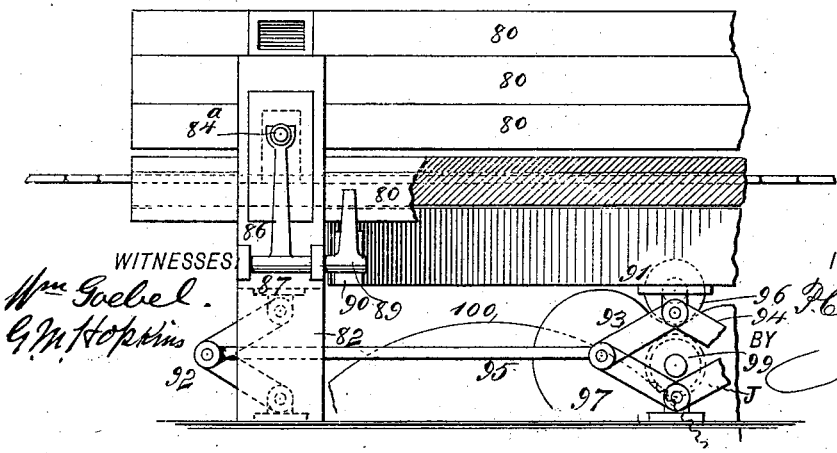
WITNESSES: Wm Goebel, G. M. Hopkins
INVENTOR: P. C. Hewitt
BY Munn & Co.
ATTORNEYS.

UNITED STATES PATENT OFFICE.

PETER COOPER HEWITT, OF NEW YORK, N. Y.

GLUE-MANIPULATING MACHINERY.

SPECIFICATION forming part of Letters Patent No. 548,056, dated October 15, 1895.

Application filed July 6, 1894. Serial No. 516,761. (No model.)

*To all whom it may concern:*

Be it known that I, PETER COOPER HEWITT, of New York city, in the county and State of New York, have invented new and useful Improvements in Glue-Manipulating Machinery, of which the following is a specification, reference being had to the annexed drawings, forming a part thereof, in which—

Figure 1:
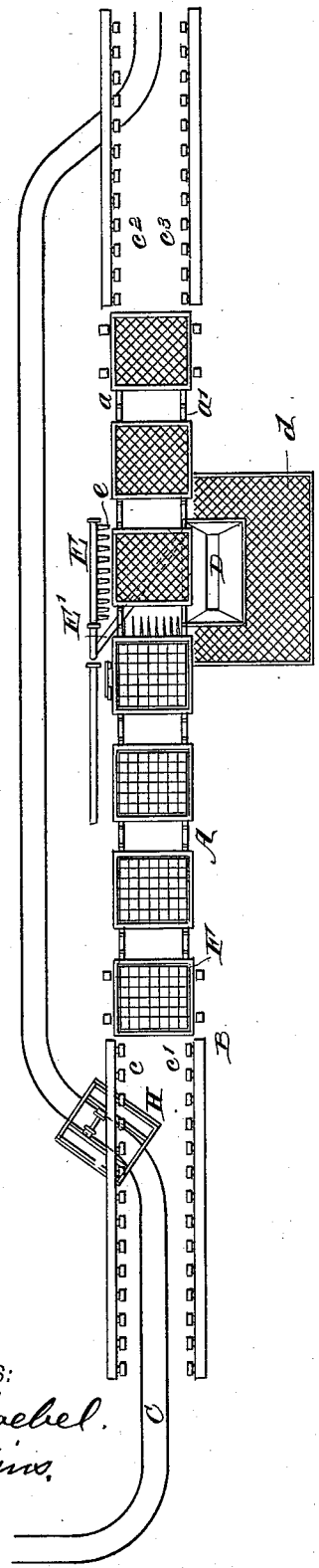
Figure 2:
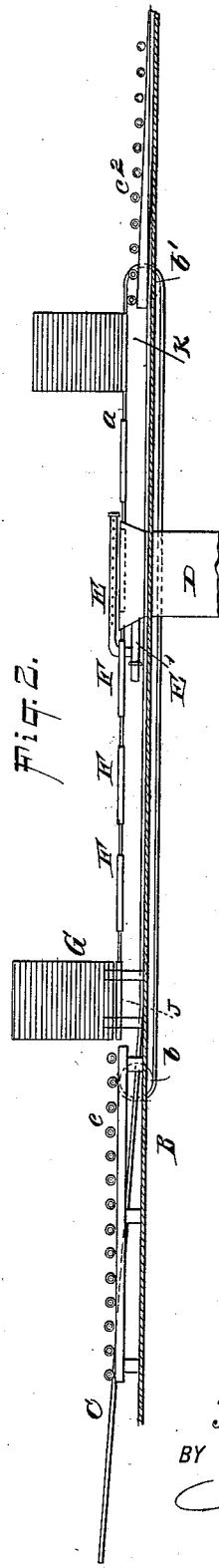

Figure 1 is a plan view of the devices for discharging glue from the nets. Fig. 2 is a side elevation of the same. Fig. 3 is a side elevation of the net-stack-carrying car and devices for removing the stack of nets from the car. Fig. 4 is a side elevation of the net-unstacker and net-conveyer. Fig. 5 is a plan view of the devices for removing the glue from the nets and delivering it to a chute. Fig. 6 is a side elevation of the same. Fig. 7 is a side elevation of the net-stacker, showing the device for delivering the net-stack to the stack-conveying car. Fig. 8 is a transverse section of a railway and of the roller-conveyer, showing a front elevation of a net-stack-carrying car. Fig. 9 is a side elevation of the net-stack remover and car-loader. Fig. 10 is a side elevation of the intermittent gearing for operating the net-stack remover. Fig. 11 is an enlarged transverse section of the net-frame-releasing mechanism. Fig. 12 is a detail view of the same, showing one of the frames released and about to be dropped on the conveyer. Fig. 13 is a vertical transverse section taken on line 13 13 in Fig. 9; and Fig. 14 is an enlarged elevation, partly in section, of the net-unstacker.

Similar letters and figures of reference indicate corresponding parts in all the views.

The object of my invention is to construct mechanism for taking the stack of nets containing the dried glue from the drying-room, unstacking the nets, removing the glue, restacking the nets, and delivering the net-stack to a car which conveys it away.

My invention consists of an endless conveyer and series of rollers arranged at opposite ends of the conveyer, one series at the receiving end of the conveyer being inclined downwardly toward the conveyer, the other series at the delivery end of the conveyer being inclined downwardly away from the conveyer, a railway extending between the inclined series of rollers at the receiving end of the apparatus, thence outwardly around the endless conveyer, thence between the inclined series of rollers at the delivery end of the apparatus, and a car constructed to run on the railway and adapted to deliver a stack of filled nets to the inclined series of rollers at one end of the apparatus and to receive a stack of empty nets from the other end of the rollers.

It also consists in the combination with these devices of mechanism for removing the stack of nets and delivering it to the net-carrying car.

It also further consists in mechanism for loosening the glue from the nets, and also in devices for discharging the loosened glue from the nets, all as will be hereinafter more fully described.

The endless conveyer A is formed of two endless chains $a\ a'$, running over sprocket-wheels $b\ b'$, secured to shafts journaled at opposite ends of the machine. At the receiving end B of the machine are arranged two rows of rollers $c\ c'$, the two series being arranged in an inclined plane leading to the endless conveyer, and at the delivery end of the machine are arranged two rows of rollers $c^2\ c^3$, which incline downwardly away from the endless conveyer. A railway-track C passes between the series of rollers $c\ c'$ and curves outwardly near the endless conveyer A, beyond which the railway curves again and extends parallel with the endless conveyer to a point opposite the series of rollers $c^2\ c^3$, where it curves inwardly and finally extends between and parallel with the said series of rollers $c^2 c^3$. The endless conveyer is driven by connection with any suitable motive power, and at a short distance beyond the middle of its length, at one side thereof, is arranged a chute D, which extends downwardly and is preferably arranged to deliver the dried glue to a floor below. A netting $d$, surrounding the mouth of the chute, is designed to catch any flying pieces of the glue and deliver them to the chute.

On the side of the conveyer opposite the chute is arranged an air-blast pipe E, provided with a series of nozzles $e$, and underneath the upper portion of the conveyer is arranged a pipe $E'$, which extends in a diagonal line across the under surface of the upper portion of the conveyer and is provided with a series of air-nozzles $e'$, similar to the nozzles $e$, which are directed upwardly.

Under the upper portion of the conveyer is journaled a rock-shaft $f$, carrying a series of whips $g$, of rawhide or analogous material. The rock-shaft $f$ is provided with an arm $h$, which is connected by a rod $i$ with a crank $j$, attached to the shaft $k$, journaled in standards $l$ and provided with a sprocket-wheel $m$, which engages one of the chains of the endless conveyer A, so that as the conveyer moves forward the shaft $k$ is revolved and the rock-shaft $f$ is reciprocated, thus imparting to the whips $g$ a vibratory motion.

The nets F, carrying the dried glue, are carried forward by the endless conveyer A, and as they pass over the series of whips $g$ they are struck by the said whips with sufficient force to loosen the glue lying on the nets. As the nets pass over the air-blast pipe E', air delivered from the said pipe under pressure through the nozzles $e'$ blows the glue in an upward direction and air delivered by the air-blast pipe E through the nozzles $e$ blows the glue in the direction of the chute D, which delivers it to the floor below.

The nets F arrive at the apparatus in stacks G, the stacks being brought from the drying-room on the car H, running on the track C. When the car H arrives at the series of rollers $c\,c'$, the net-frames F' engage the series of rollers $c\,c'$, and the track C being inclined at a greater angle than the series of rollers the net-stack G, by its motion along the series of rollers, is lifted from the car and supported wholly by the rollers, when the car, by virtue of the inclination of the track C, moves forward of its own gravity and passes down the track C to the delivery end of the apparatus. The net-stack, which was deposited on the rollers by the car in the manner shown in Fig. 3, moves along the series of rollers by its own gravity, the inclination of the series being just sufficient to carry the net-stack forward to the stop I of the net-unstacker J, which delivers the nets one by one to the conveyer A in the manner presently to be described, and the nets after they are emptied are delivered to the net-stacker K one by one, and after the stack is completed it is removed from the net-stacker by the net-stack remover L and delivered to the series of rollers $c^2\,c^3$, along which the stack moves by its own gravity until it is delivered to the car H, which at this time is in waiting at the lower end of the inclined series of rollers. The car in its passage from the receiving end to the delivery end of the machine is stopped in this position by a rocking stop M, which normally projects into the path of one of the forward car-wheels and is held in that position by a spring $n$; but when the net-stack strikes the stops $o$ at the forward end of the car H its momentum is sufficient to move the car forward and cause the rocking stop M to turn on its pivot, thus releasing the car, after which it moves forward with its load of nets to the glue-making machine or to a storage-room. The spring $n$ returns the rocking stop M to its normal position.

The net-unstacker, net-stacker, and net-stack remover are the same as described in my application for a patent for glue-making machinery, filed October 25, 1893, Serial No. 489,081. Therefore I do not here claim this mechanism except in so far as it enters into combination with other parts of my glue-manipulating machinery.

The net-unstacker is constructed as follows: On opposite sides of the endless conveyer at the receiving end of the machine are arranged standards 8 1 82, two upon each side of the conveyer, Fig. 4. The distance between the standards 81 82 of one side and the standards of the opposite side is sufficient to receive between them the net-frames 80. The net-frames are provided with two notches in each side for receiving the retaining-pawls 83, which are capable of projecting beyond the inner faces of the standards 81 82 and also of dropping back into a recess in the standard when released, each pawl being provided with a weighted arm 84 for causing it to drop back when released in the manner presently to be described. In a plate covering the back of the recess containing the pawl 83 is inserted a rod $84^a$, which is pressed forward into contact with the pawl 83 by the spiral spring 85, surrounding it and abutting against the plate. The outer end of the rod $84^a$ passes through an arm 86, secured to a rock-shaft 87, journaled in ears projecting from the standard 82. Upon the rod $84^a$, outside of the arm 86, is placed a wing-nut 88, and upon the shaft 87 is secured an arm 89, extending toward the center of the machine into the path of a tripper 90, secured to the net-lowering bar 91. The pawls 83 and accompanying devices are the same upon opposite sides of the machine, but oppositely arranged with respect to each other, so that the pawls on one side engage the notches in one side of the net-frame and the pawls on the other side engage the notches in the other side of the frame. The bars 91 are connected at opposite ends with toggle-joints 92, the said toggle-joints being oppositely arranged with respect to each other, and a pair of oppositely-arranged toggle-joints 93 94 are connected with the middle of each bar 91 and also with the floor, and the intermediate pivots of the toggle-joints are connected by rods 95 with the central pivot of the toggle-joints at the ends of the bars 91. This arrangement of toggle-joints and bars forms a parallel motion whereby the bars 91 are kept in a horizontal position when raised or lowered, in the manner hereinafter described. Each bar 91 carries a roller 96, which rides upon a cam 97, secured to the shaft 98, there being one such cam on each end of the said shaft, and to the shaft 98 is imparted an intermittent rotary motion by a segmental pinion 99 on the said shaft and a segmental gear-wheel 100 on the shaft 101, which receives its motion from the shaft 78, through miter-gearing 102, the shaft 103, and miter-gearing 104. The stack of net-frames 80 is delivered to the unstacker in the manner described. Posts 81ª, erected on the said platform, act as stops when placing the net-frames in position to be fed to the unstacker.

The net-stacker is constructed as follows: At the opposite end of the machine and upon opposite sides of the endless net-frame conveyer are arranged posts 105 106, and in the said posts are pivoted spring-pressed pawls 107, Fig. 13, which are capable of engaging the notches in the net-frame, and below the level of the endless conveyer A is arranged mechanism like that already described, comprising bars 91ª, toggle-joints 82ª 83ª 93ª 94ª, rods 95ª, the cam 97ª, segmental pinion 99ª, segmental spur-wheel 100ª, journaled on the shaft 101ª, which takes power through miter-gearing 104ª, shaft 103ª, and miter-gearing 102ª from the shaft 79. Above the conveyer A at the delivery end of the machine is arranged a frame 107ª, in which are journaled rollers $c^2$ for receiving and supporting the stack of frames when loaded and ready for delivery, and posts 109 110 support studs 111, 112, 113, and 114, upon which turn the sprocket-wheels 115, 116, 117, and 118, there being one set of four sprocket-wheels on each side of the machine, and upon the said sprocket-wheels is supported an endless chain 119, carrying bars 120. Each sprocket-wheel 118 is provided with a pinion 121, which receives motion from a spur-wheel 122, to which is attached a segmental pinion 123, which is engaged by the segmental spur-wheel 124 on the shaft 125, the said segmental spur-wheel having a portion of its periphery plain to receive the stop 126, formed on the segmental pinion. The shaft 125 is provided with a spur-wheel 127, which is connected through an intermediate spur-wheel 128 with a pinion 129 on the shaft 130, and the said shaft 130 carries a spur-wheel 131, which receives motion from a pinion 132 on the shaft 79. The net-frames having been placed in the form of a stack G above the unstacking mechanism, the net-frames 80 are delivered one by one to the endless conveyer A by the unstacking mechanism, which operates as follows: The stack of frames being held by the pawls 83 to engage the lower frame of the stack, the bars 91 are lifted by the cams 97. As the said bars 91 come into contact with the under surface of the lower frame the trippers 90 engage the arms 89, thus turning the rock-shaft 87 and through the movement of the arms 86 withdrawing the spring-pressed rods 84ª from the pawls 83, allowing the weights 84 to tilt the pawls and disengage them from the net-frames 80 as the weight of the net is taken from the pawls by the bars 91. The continued movements of the cams 97 allow the bars 91 to descend, thus lowering the entire stack of net-frames and at the same time releasing the arms 89 86, allowing the spring-pressed rods 84ª to move forward against the pawls 83, so that when the second frame from the bottom of the stack reaches the pawls the said pawls engage the notches in the frame and support the entire stack. The lower net-frame of the stack being below the device continues its descent until it rests upon the endless conveyer A, which moves the frame forward from beneath the stack of frames, so as to permit of another excursion of the bars 91. The nets after being emptied are still carried forward until arrested by the posts 74ª, when they are received by the bars 91 of the stacking mechanism, which correspond to the bars 91 of the unstacking mechanism at the opposite end of the machine while the said bars are in their lowest position, and the said bars are raised by the cam 97ª in the manner above described, lifting the net-frame 80 from the conveyer A, carrying upward with the said frame the superimposed frames until it is brought into engagement with the pawls 107, thus adding one frame after another to the bottom of the stack until a stack is formed of convenient size for handling.

The height of the stack is controlled by the gearing connected with the endless chain 119. The said gearing takes its motion from some moving part of the machinery or from the source of power, and is timed so as to work synchronously with the unstacker and the separator and subdivider. The chain 119 is moved forward intermittently by the segmental wheel 124, the segmental pinion 123, the spur-wheel 122, pinion 121, and sprocket-wheel 118. The bars 120, connected with the chains 119 on opposite sides of the machine, engage the stack of frames 80 and move it forward to the rollers $c^2$ $c^3$.

Having thus described my invention, I claim as new and desire to secure by Letters Patent—

1. In glue manipulating machinery, the combination of a net conveyer, one or more nets for carrying dried glue, a net unstacker for delivering nets to the conveyer, and means for discharging the dried glue from the nets, substantially as specified.

2. In glue manipulating machinery, the combination of a net conveyer, nets for carrying dried glue, a glue discharger for removing dried glue from the nets, and a net stacker, substantially as specified.

3. In glue manipulating machinery, the combination with the net conveyer, net stacker and net unstacker, of a railway provided with a car constructed for carrying a stack of nets, and means for transferring the net stack to the unstacker, substantially as specified.

4. In glue manipulating machinery, the combination with the net stacker, of mechanism for discharging the net stack, a stack conveying car, and means for delivering the net stack to the car, substantially as specified.

5. In glue manipulating machinery, a net unstacker, a net conveyer arranged for conveying the nets from the unstacker, a net discharger, a stacker for stacking empty nets, and a railway with one or more cars constructed to deliver the net stack to the unstacker and to carry away the stack of empty nets, substantially as specified.

6. In glue manipulating machinery, the combination with net discharging mechanism, of an automatic railway and car for delivering a net stack at one end of the machine and in another part of its course taking a net stack away from the opposite end of the machine, substantially as specified.

7. The combination of a car for conveying nets to the net discharging mechanism, an unstacker for delivering the nets one by one to the conveyer, a conveyer for carrying forward the nets, and a discharger for removing the glue from the nets, substantially as specified.

8. The combination with a net conveyer and nets of coarse mesh resting on the conveyer and carrying pieces of adhesive material such as glue, of whips constructed to beat the net on the under side and loosen the glue, substantially as specified.

9. The combination with a net conveyer, of whips constructed to beat the net on the under side, and an air blast for removing the glue from the net, substantially as specified.

10. The combination, with a glue supporting net, of an air blast nozzle for blowing the dried glue from the net and an auxillary air blast nozzle for delivering an air blast laterally against the ascending glue, substantially as specified.

11. In glue manipulating machinery, two series of supporting rollers having fixed axles and having a clear space between the series, and a railway extending between the series of rollers and provided with a car constructed for carrying a stack of nets for delivery to the two series of rollers, substantially as specified.

12. The combination with the glue carrying net of air blast nozzles for removing the glue from the net and propelling it laterally, and a chute for receiving the glue discharged by the net, substantially as specified.

13. The combination with a car adapted for carrying a net stack, and a stack of nets supported by the car and carried thereon, of a railway track for the car, and a series of rollers, substantially as specified, whereby the car may deliver the net stack to the series of rollers and then pass from under the net stack, leaving the net stack on the series of rollers, as described.

14. The combination, with a net conveyer adapted to hold a series of nets in the same plane and a stack of nets supported adjacent to the conveyer, of mechanism for removing the nets from the net stack and depositing them one by one upon the conveyer, the net unstacking mechanism being timed with reference to the speed of the conveyer to deliver the nets to the conveyer with spaces between the edges of adjacent nets, as specified.

15. The combination with the net stacker provided with automatic stacking mechanism formed of an intermittently operated net and net stack elevator and retaining devices, of a net conveyer carrying a series of nets lying in the same plane, the said conveyer being adapted to deliver the nets to the stacker one by one, as herein specified.

16. The combination with a net conveyer, of a continuous railway track leading to and along and away from the conveyer, and a car for delivering nets to one end of the conveyer, substantially as specified.

17. In glue manipulating machinery, the combination of a conveyer for carrying empty nets, a net stacker for receiving nets from the net conveyer and stacking them one by one, and a stack discharger for removing the net stack and delivering it to a car, substantially as specified.

18. The combination with a net discharger, of a car for delivering nets to and removing them from the discharger, and a track for the car extending from the unstacker to the stacker, substantially as specified.

19. The combination of a car, railway track and net discharger, and a series of rollers inclined to the railway track and adapted to receive the net stack, as specified.

20. In glue manipulating machinery, the combination of a net carrier, glue holding nets moved forward by the carrier, an agitating device placed below the net carrier and adapted to strike the nets upon their under surfaces, and an air blast device for removing glue from the nets, substantially as specified.

21. In glue manipulating machinery, the combination, with the net conveyer and net stack, of a roller-way located at the end of the conveyer and a net-stacker located between the conveyer and roller way, substantially as specified.

22. In glue manipulating machinery, the combination with the net conveyer and discharger, of a railway, a car constructed for receiving and carrying a net stack, and intermediate roller-ways at the ends of the conveyer for carrying the net stack from the car to one end of the conveyer, and taking the net stack from the other end of the conveyer and delivering it to the car, substantially as specified.

23. In glue manipulating machinery, the combination with a stack of nets and net discharging mechanism, of a car and inclined railway for delivering a net stack at one end of the machine and taking a net stack away from the opposite end of the machine, substantially as specified.

24. In glue manipulating machinery, the combination of the net conveyer, net stack, net unstacking mechanism, and the roller way, substantially as specified.

PETER COOPER HEWITT.

Witnesses:
  GEO. M. HOPKINS,
  C. SEDGWICK.